United States Patent Office 3,133,090
Patented May 12, 1964

3,133,090
ALUMINUM DECABORANE TETRAHYDRO-
FURAN ADDUCT
John W. Ager, Jr., Buffalo, N.Y., assignor to Olin
Mathieson Chemical Corporation, a corporation of
Virginia
No Drawing. Filed Sept. 24, 1958, Ser. No. 763,145
2 Claims. (Cl. 260—346.1)

This invention relates to the preparation of the new adduct, aluminum decaborane tetrahydrofuran, $Al(B_{10}H_{13})_3 \cdot 2C_4H_8O$. More in particular, this invention relates to the preparation of the aluminum decaborane tetrahydrofuran adduct by reacting aluminum and decaborane while they are dissolved in liquid ammonia, evaporating the ammonia to provide a solid residue, dissolving the solid residue in tetrahydrofuran, heating the resultant solution until ammonia evolution substantially ceases, and separating a solid aluminum decaborane tetrahydrofuran adduct from the resulting solution. The reaction between the aluminum and decaborane is generally conducted at a temperature of from $-60°$ C. to $+40°$ C., elevated pressures being used when needed to keep the ammonia in liquid phase. The adducts are light gray.

The aluminum decaborane adducts prepared by the method of this invention can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. These aluminum decaborane adducts when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following example illustrates the invention:

*Example*

Aluminum, 7 grams, that had been cleaned with a water solution of potassium hydroxide, washed with water, methanol, and then ether, was placed in a 250 ml. three-neck flask with 3 grams of decaborane. About 100 ml. of ammonia gas was condensed into the flask which was cooled with "Dry Ice," and the mixture was allowed to react for 40 minutes. The liquid ammonia solution was then siphoned into another flask and the excess aluminum was washed with liquid ammonia. Ammonia was evaporated from the combined ammonia solution which was gray and slightly cloudy. To the light gray solid residue was added 100 ml. of tetrahydrofuran. The solids dissolved in the tetrahydrofuran giving a green solution. The green solution was heated at reflux temperature (64°–66° C.) and ammonia evolved. After about 10 minutes, a heavy white precipitate formed. The mixture of precipitate and tetrahydrofuran was placed in an inert atmosphere and dry ammonia gas was bubbled through until the precipitate dissolved, again producing a green solution. The solution was filtered to free it from a small amount of cloudy solid and the tetrahydrofuran filtrate was refluxed until the precipitate reformed. The tetrahydrofuran was then distilled off and the residue placed in a vacuum desiccator for three hours. The light gray solid weighed almost 5 grams. An elemental analysis, performed twice with respect to the metal components, of 2.18 grams of this solid, which was heated in a vacuum oven at 100° C. for about 3 hours, showed that it contained 57.8, 57.6 percent boron, 4.75 percent carbon, 10.56 percent hydrogen and 16.1, 16.1 percent aluminum. This corresponds closely to a material having the formula $Al(B_{10}H_{13})_3 \cdot 2C_4H_8O$.

The boron-containing solid material produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing the aluminum decaborane products, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain a binder such as an artificial resin, generally of the urea-formaldehyde or phenol-formaldehyde type, or an artificial rubber like substance, the function of the binder being to give the propellant mechanical strength and at the same time improve its burning characteristics. Thus, in manufacturing a suitable propellant proper proportions of finely divided oxidizer and finely divided aluminum decaborane product can be admixed with a suitable binder, the proportions being such that the amount of the binder is about 5 to 10 percent by weight, based upon the weight of the oxidizer and the aluminum decaborane product. The ingredients are thoroughly mixed and following this the mixture is molded into the desired shape, as by extrusion. Thereafter, the binder can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

1. A method for the preparation of an aluminum decaborane tetrahydrofuran adduct which comprises reacting aluminum metal and decaborane at a temperature of from $-60°$ to $+40°$ C. while the reactants are dissolved in liquid ammonia, evaporating the ammonia to provide a solid residue, dissolving the solid residue in tetrahydrofuran, heating the resultant solution until ammonia evolution substantially ceases, and separating a solid aluminum decaborane tetrahydrofuran adduct from the resulting solution.

2. An adduct of the formula $Al(B_{10}H_{13})_3 \cdot 2C_4H_8O$.

No references cited.